(12) United States Patent
Liu

(10) Patent No.: US 10,306,636 B2
(45) Date of Patent: May 28, 2019

(54) METHOD AND DEVICE FOR CARRIER AGGREGATION CONFIGURATION BASED ON MULTI-BAND CAPABILITY

(71) Applicant: ZTE Corporation, Shenzhen (CN)

(72) Inventor: Na Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 50 days.

(21) Appl. No.: 15/561,348

(22) PCT Filed: Dec. 14, 2015

(86) PCT No.: PCT/CN2015/097229
§ 371 (c)(1),
(2) Date: Sep. 25, 2017

(87) PCT Pub. No.: WO2016/150201
PCT Pub. Date: Sep. 29, 2016

(65) Prior Publication Data
US 2018/0084549 A1    Mar. 22, 2018

(30) Foreign Application Priority Data

Mar. 25, 2015   (CN) .......................... 2015 1 0133036

(51) Int. Cl.
*H04W 4/00*    (2018.01)
*H04W 72/04*   (2009.01)
(Continued)

(52) U.S. Cl.
CPC ......... *H04W 72/0453* (2013.01); *H04L 5/001* (2013.01); *H04L 5/008* (2013.01);
(Continued)

(58) Field of Classification Search
CPC ............ H04W 72/0453; H04W 72/048; H04L 5/001; H04L 5/0042; H04L 5/008; H04L 5/0092
(Continued)

(56) References Cited

U.S. PATENT DOCUMENTS

2010/0135238 A1* 6/2010 Sadri ................. H04W 72/0453
                                                       370/329
2013/0114508 A1* 5/2013 Liang .................... H04L 5/001
                                                       370/328
(Continued)

FOREIGN PATENT DOCUMENTS

CN    102149143 A    8/2011
CN    102368871 A    3/2012
(Continued)

OTHER PUBLICATIONS

International Search Report for corresponding application No. PCT/CN2015/097229 filed on Dec. 14, 2015; dated Mar. 15, 2016.

*Primary Examiner* — Sai Ming Chan
(74) *Attorney, Agent, or Firm* — Cantor Colburn LLP

(57) ABSTRACT

A frequency band basis for access of user equipment (UE) to a serving cell is determined. Configuration information for an inter-frequency neighbor cell, at a preset physical frequency point, of the frequency band basis for the access of the UE to the serving cell, and one or more carrier aggregation combinations supported by the UE are acquired. A target frequency band of a secondary carrier required to be configured by the UE is determined according to the configuration information for the inter-frequency neighbor cell and the one or more carrier aggregation combinations supported by the UE. A corresponding reconfiguration message is sent to the UE and an inter-frequency neighbor cell, at the preset physical frequency point, of the target frequency band is used as a secondary serving cell according to a carrier
(Continued)

aggregation capability of the UE in the target frequency band.

20 Claims, 3 Drawing Sheets

(51) Int. Cl.
*H04L 5/00* (2006.01)
*H04W 76/27* (2018.01)
*H04W 88/02* (2009.01)

(52) U.S. Cl.
CPC .......... *H04L 5/0042* (2013.01); *H04L 5/0092* (2013.01); *H04W 72/048* (2013.01); *H04W 76/27* (2018.02); *H04W 88/02* (2013.01)

(58) Field of Classification Search
USPC ........................................................ 370/329
See application file for complete search history.

(56) References Cited

U.S. PATENT DOCUMENTS

2013/0322370 A1* 12/2013 Fong ................... H04W 72/048
                                                              370/329
2014/0086078 A1*  3/2014 Malladi ............... H04W 72/042
                                                              370/252

FOREIGN PATENT DOCUMENTS

| CN | 102378370 A | 3/2012 |
| CN | 102595597 A | 7/2012 |
| WO | 2013181483 A2 | 12/2013 |

\* cited by examiner

METHOD AND DEVICE FOR CARRIER AGGREGATION CONFIGURATION BASED ON MULTI-BAND CAPABILITY

TECHNICAL FIELD

The present disclosure relates to the field of wireless communication, in particular to a method and device for carrier aggregation configuration based on multi-band capability.

BACKGROUND

The International Telecommunication Union (ITU) raises relatively stringent requirements on a next-generation mobile communication system, namely an International Mobile Telecommunications-Advanced (IMT-A). The requirements may include, for example, a maximum system transmission bandwidth reaching e.g., 100 MHZ, a peak rate of uplink and downlink data transmission reaching e.g., 1000 Megabits per second (i.e., 1 Gbps) and 500 Megabits per second (i.e., 500 Mbps), and a very high requirement on average spectral efficiency of the system, especially on edge frequency spectrum efficiency. In order to be better compatible with existing standards of Long Term Evolution (LTE), reduce the complexity of standardized work and support flexible application scenarios, the 3rd Generation Partnership Project (3GPP) proposes a Carrier Aggregation (CA) technology, which may achieve a larger bandwidth by aggregating multiple component carriers.

The carrier aggregation function may meet a higher requirement on bandwidth for a next-generation mobile cellular communication system, namely, a Long Term Evolution Advanced (LTE-A) system, and may serve as a necessary technology for guaranteeing backward compatibility with the LTE system. At present, the maximum bandwidth supported by an LTE system is e.g., 20 MHz, while the LTE-A system may achieve a maximum transmission bandwidth of up to e.g., 100 MHz through a carrier aggregation function.

The carrier aggregation may refer to aggregation of two or even more carriers (e.g., up to five carriers) by a base station (e.g., an Evolved Node B, which may be abbreviated as eNB). The aggregated carriers may be sent to user equipment (UE) by the base station via e.g., a Radio Resource Control (RRC) reconfiguration message, so that the UE may perform service transmission by virtue of the aggregated carriers. Among the aggregated carriers, a carrier, which keeps RRC connection with the UE, may be referred to as a Primary Carrier Component (PCC) and a cell corresponding to the PCC may be called as a Primary Cell (Pcell); and a carrier other than the PCC may be referred to as a Secondary Carrier Component (SCC) and a cell corresponding to the SCC may be called as a Secondary Cell (Scell). The carrier aggregation may include three scenarios as follows: contiguous intra-band carrier aggregation, non-contiguous intra-band carrier aggregation and inter-band carrier aggregation.

In a continuous evolution process of 3GPP, more and more spectrum resources may be gradually applied to an LTE system, so that frequency overlapping phenomenon may exist in different frequency band ranges of LTE, that is, the same physical frequency may correspond to multiple frequency band indicators. Due to the fact that the carrier aggregation capability of the UE may be closely related to the frequency band, even for an overlapped frequency band, if the UE does not support carrier aggregation for this frequency band, the carrier aggregation operation cannot be carried out. Therefore, even though carrier aggregation can be carried out for an actual physical frequency point, due to the limitation of the cell frequency band or the adjacent cell configuration of the base station side, or due to the restriction of carrier aggregation capability of the UE, service throughput of the UE may not be improved and system performance may not be improved, which may seriously influence the user experience.

SUMMARY

Some embodiments of the present disclosure provide a method and device for carrier aggregation configuration based on multi-band capability. Spectrum resources may be fully and effectively utilized, data service throughput of the user may be improved, system performance may be improved, and the service experience of a user under an LTE system may be enhanced.

The solution adopted by some embodiments of the present disclosure is described as follows.

An embodiment of the present disclosure provides a method for carrier aggregation configuration based on multi-band capability. The method for carrier aggregation configuration may include the following acts.

A frequency band basis for access of user equipment (UE) to a serving cell may be determined so as to enable the UE to access the serving cell according to the frequency band basis. The serving cell may be configured with at least two frequency bands, and an overlapping part may exist between the at least two frequency bands.

Configuration information for an inter-frequency neighbor cell, at a preset physical frequency point, of the frequency band basis for the access of the UE to the serving cell, and one or more carrier aggregation combinations supported by the UE may be acquired.

A target frequency band of a secondary carrier required to be configured by the UE may be determined according to the configuration information for the inter-frequency neighbor cell, at the preset physical frequency point, of the frequency band basis and the one or more carrier aggregation combinations supported by the UE.

A corresponding reconfiguration message may be sent to the UE according to a carrier aggregation capability of the UE in the target frequency band, and an inter-frequency neighbor cell, at the preset physical frequency point, of the target frequency band may be used as a secondary serving cell.

In an embodiment, the carrier aggregation capability of the UE in the target frequency band may include: the UE supporting a non-contiguous intra-band carrier aggregation or contiguous intra-band carrier aggregation or inter-band carrier aggregation of the target frequency band.

In an embodiment, when the UE supports the non-contiguous intra-band carrier aggregation or contiguous intra-band carrier aggregation of the target frequency band, the act of sending the corresponding reconfiguration message to the UE according to the carrier aggregation capability of the UE in the target frequency band, and using the inter-frequency neighbor cell, at the preset physical frequency point, of the target frequency band as the secondary serving cell may include the following acts.

The reconfiguration message may be sent to the UE according to the carrier aggregation capability of the UE in the target frequency band, and the inter-frequency neighbor cell, at the preset physical frequency point, of the target frequency band may be used as the secondary serving cell.

In this embodiment, the reconfiguration message may include a target frequency band of the secondary carrier required to be configured by the UE, and information indicating to modify an Evolved Universal Terrestrial Radio Access (E-UTRA) Absolute Radio Frequency Channel Number (EARFCN) of a frequency band basis corresponding to the preset physical frequency point of the serving cell into an EARFCN of the target frequency band.

In an embodiment, when the UE supports the inter-band carrier aggregation of the target frequency band, the act of sending the corresponding reconfiguration message to the UE according to the carrier aggregation capability of the UE in the target frequency band, and using the inter-frequency neighbor cell, at the preset physical frequency point, of the target frequency band as the secondary serving cell may include the following acts.

A first target frequency band and a second target frequency band of the inter-band carrier aggregation supported by the UE may be acquired. The target frequency band including the preset physical frequency point may be the first target frequency band, and the target frequency band not including the preset physical frequency point may be the second target frequency band.

The reconfiguration message may be sent to the UE, and the inter-frequency neighbor cell, at the preset physical frequency point, of the second target frequency band may be used as the secondary serving cell. In this embodiment, the reconfiguration message may include the first target frequency band including the secondary carrier required to be configured by the UE, and information indicating to modify an E-UTRA Absolute Radio Frequency Channel Number (EARFCN) of a frequency band basis corresponding to the preset physical frequency point of the serving cell into an EARFCN of the first target frequency band.

In an embodiment, if the reconfiguration message further includes information for carrying out secondary carrier inter-frequency measurement of the target frequency band, the act of using the inter-frequency neighbor cell, at the preset physical frequency point, of the target frequency band as the secondary serving cell may include the following act.

The inter-frequency neighbor cell, at the preset physical frequency point, of the target frequency band may be used as the secondary serving cell according to a measurement result of the secondary carrier inter-frequency measurement of the target frequency band carried out according to the reconfiguration message by the UE.

In an embodiment, if the reconfiguration message further includes information for carrying out secondary carrier inter-frequency measurement of the target frequency band, the act of using the inter-frequency neighbor cell, at the preset physical frequency point, of the second target frequency band as the secondary serving cell may include the following act.

The inter-frequency neighbor cell, at the preset physical frequency point, of the second target frequency band may be used as the secondary serving cell according to a measurement result of the secondary carrier inter-frequency measurement of the target frequency band carried out according to the reconfiguration message by the UE.

In an embodiment, the act of determining the frequency band basis for the access of the UE to the serving cell may include the following acts.

Frequency band configuration information of the serving cell and information of one or more frequency bands supported by the UE may be acquired.

The frequency band basis for the access of the UE to the serving cell may be determined according to the frequency band configuration information of the serving cell and the information of the one or more frequency bands supported by the UE.

In an embodiment, the act of determining, according to the configuration information for the inter-frequency neighbor cell, at the preset physical frequency point, of the frequency band basis and the one or more carrier aggregation combinations supported by the UE, the target frequency band of the secondary carrier required to be configured by the UE may include the following acts.

A carrier aggregation capability of one or more frequency bands not actually accessed by the UE may be determined according to the configuration information for the inter-frequency neighbor cell, at the preset physical frequency point, of the frequency band basis and the one or more carrier aggregation combinations supported by the UE.

The target frequency band of the secondary carrier required to be configured by the UE may be determined according to the carrier aggregation capability of the one or more frequency bands not actually accessed by the UE.

In an embodiment, when the frequency bands not actually accessed by the UE include a plurality of frequency bands supporting carrier aggregation, the act of determining, according to the carrier aggregation capability of the one or more frequency bands not actually accessed by the UE, the target frequency band of the secondary carrier required to be configured by the UE may include the following acts.

A priority sequence of the frequency bands not actually accessed by the UE may be acquired.

The target frequency band of the secondary carrier required to be configured by the UE may be determined according to the priority sequence of the frequency bands not actually accessed by the UE and the carrier aggregation capability of the frequency bands not actually accessed by the UE.

In an embodiment, the act of sending the reconfiguration message to the UE may include the following act.

The reconfiguration message may be sent to the UE via a Radio Resource Control (RRC) signaling.

Another embodiment of the present disclosure provides a method for carrier aggregation configuration based on multi-band capability. The method may include the following acts.

A serving cell may be accessed according to a frequency band basis determined by a base station.

A corresponding reconfiguration message sent by the base station according to a carrier aggregation capability of the UE in a target frequency band may be received.

Processing may be conducted according to the reconfiguration message so that the UE carries out carrier aggregation.

In an embodiment, the carrier aggregation capability of the UE in the target frequency band may include: the UE supporting a non-contiguous intra-band carrier aggregation or contiguous intra-band carrier aggregation or inter-band carrier aggregation of the target frequency band.

In an embodiment, when the UE supports the non-contiguous intra-band carrier aggregation or contiguous intra-band carrier aggregation of the target frequency band, the act of conducting processing according to the reconfiguration message may include the following acts.

According to the reconfiguration message, an E-UTRA Absolute Radio Frequency Channel Number (EARFCN) of a frequency band basis corresponding to a preset physical frequency point of the serving cell may be modified into an EARFCN of the target frequency band, a secondary carrier adding operation may be performed for a secondary carrier corresponding to the target frequency band, and a reconfiguration completion message may be sent to the base station.

In an embodiment, when the UE supports the inter-band carrier aggregation of the target frequency band, the act of conducting processing according to the reconfiguration message may include the following acts.

A first target frequency band and a second target frequency band supporting inter-band carrier aggregation may be reported. The target frequency band including the preset physical frequency point may be the first target frequency band, and the target frequency band not including the preset physical frequency point may be the second target frequency band.

According to the reconfiguration message, an E-UTRA Absolute Radio Frequency Channel Number (EARFCN) of a frequency band basis corresponding to the preset physical frequency point of the serving cell may be modified into an EARFCN of the first target frequency band, a secondary carrier adding operation may be performed for a secondary carrier corresponding to the first target frequency band, and a reconfiguration completion message may be sent to the base station.

In an embodiment, the act of conducting processing according to the reconfiguration message may further include the following act.

Secondary carrier inter-frequency measurement of the target frequency band may be carried out, and a measurement result may be sent to the base station.

Still another embodiment of the present disclosure provides a device for carrier aggregation configuration based on multi-band capability. The device may include: a first determination module, an acquisition module, a second determination module and a first processing module.

The first determination module may be configured to determine a frequency band basis for access of UE to a serving cell so as to enable the UE to access the serving cell according to the frequency band basis. The serving cell may be configured with at least two frequency bands, and an overlapping part may exist between the at least two frequency bands.

The acquisition module may be configured to acquire configuration information for an inter-frequency neighbor cell, at a preset physical frequency point, of the frequency band basis for the access of the UE to the serving cell, and one or more carrier aggregation combinations supported by the UE.

The second determination module may be configured to determine, according to the configuration information for the inter-frequency neighbor cell, at the preset physical frequency point, of the frequency band basis and the one or more carrier aggregation combinations supported by the UE, a target frequency band of a secondary carrier required to be configured by the UE.

The first processing module may be configured to, according to a carrier aggregation capability of the UE in the target frequency band, send a corresponding reconfiguration message to the UE and use an inter-frequency neighbor cell, at the preset physical frequency point, of the target frequency band as a secondary serving cell.

Still another embodiment of the present disclosure provides a device for carrier aggregation configuration based on multi-band capability. The device may include: an access module, a receiving module and a second processing module.

The access module may be configured to access a serving cell according to a frequency band basis determined by a base station.

The receiving module may be configured to receive a corresponding reconfiguration message sent by the base station according to a carrier aggregation capability of the UE in a target frequency band.

The second processing module may be configured to conduct processing according to the reconfiguration message so that the UE carries out carrier aggregation.

The beneficial effects of some embodiments of the present disclosure are described as follows.

By virtue of the method for carrier aggregation configuration based on multi-band capability provided in some embodiments of the present disclosure, the multi-band information configured by the base station side and the carrier aggregation capability information of the UE may be comprehensively considered to determine the target frequency band of the secondary carrier required to be configured by the UE, thereby realizing carrier aggregation of the target frequency band. According to the method for carrier aggregation configuration based on the multi-band capability of some embodiments of the present disclosure, the impact on the carrier aggregation function of the UE, which is caused by the limitation of the cell frequency band or the adjacent cell configuration of the base station side or by the restriction of carrier aggregation capability of the UE, may be avoided. By virtue of the solution provided in some embodiments of the present disclosure, use range of the carrier aggregation function may be greatly expanded, and frequency spectrum efficiency of the system may be effectively increased, thereby improving the user experience.

DETAILED DESCRIPTION OF THE EMBODIMENTS

Figure 1:
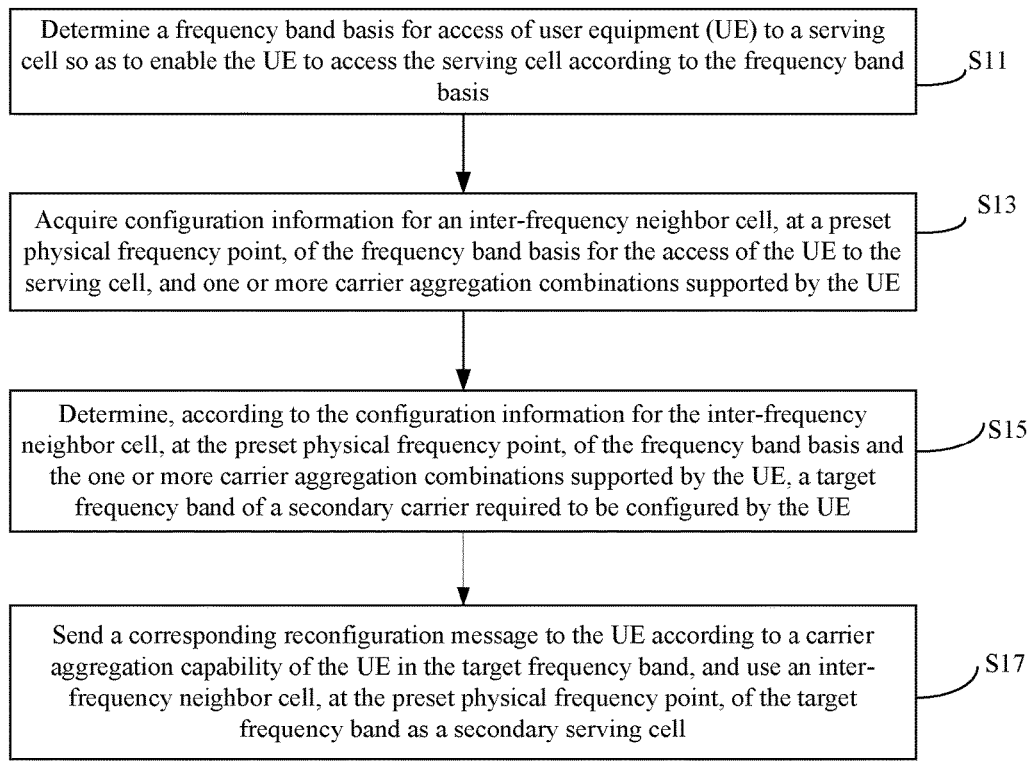
FIG. 1 shows a flow chart of a method for carrier aggregation configuration based on multi-band capability which is applied to a base station side according to an embodiment of the present disclosure.

Some exemplary embodiments of the disclosure will now be described in more detail below with reference to the accompanying drawings. Although the exemplary embodiments of the disclosure are shown in the drawings, it should be understood, however, that the present disclosure may be embodied in various forms and should not be limited to the exemplary embodiments set forth herein. Rather, these embodiments are provided in order to provide a more thorough understanding of the present disclosure, and may completely convey the scope of the present disclosure to those skilled in the art.

An embodiment of the present disclosure provides a method for carrier aggregation configuration based on multi-band capability. The method may be applied at a base station side. As shown in FIG. 1, the method may include the following acts.

At act S11, a frequency band basis for access of user equipment (UE) to a serving cell may be determined so as to enable the UE to access the serving cell according to the frequency band basis.

The serving cell may be configured with at least two frequency bands, and an overlapping part may exist between the at least two frequency bands. The frequency band basis may refer to a frequency band in which UE accesses a serving cell. For example, the UE may access the serving cell in, for example, a frequency band (or short as band) 38 (i.e., 2570 MHz to 2620 MHz), then the band 38 is the frequency band basis for access of the UE to the serving cell.

In an exemplary embodiment, the act S11 may include the following acts.

Frequency band configuration information of the serving cell and information of one or more frequency bands supported by the UE may be acquired.

The frequency band basis for the access of the UE to the serving cell may be determined according to the frequency band configuration information of the serving cell and the information of the one or more frequency bands supported by the UE.

For example, the frequency band configuration information of the serving cell at the base station side may be as follows: multi-band indication configuration supported by the serving cell may be that a primary frequency band is band 38 and a secondary frequency band is band 41 (that is, 2496 MHz to 2690 MHz). The frequency bands supported by the UE may be band 38 and band 41. Under such a condition, the frequency band basis of the UE may be determined according to a configuration sequence of frequency bands of the serving cell at the base station side. For example, whether the UE supports the band 38 or not may be judged first, and if the UE does not support the band 38, whether the UE supports the band 41 or not may be judged. In this example, the frequency band basis of the UE may be determined as band 38, namely, the UE may access the serving cell in the band 38.

At act S13, configuration information for an inter-frequency neighbor cell, at a preset physical frequency point, of the frequency band basis for the access of the UE to the serving cell, and one or more carrier aggregation combinations supported by the UE may be acquired.

At act S15, a target frequency band of a secondary carrier required to be configured by the UE may be determined according to the configuration information for the inter-frequency neighbor cell, at the preset physical frequency point, of the frequency band basis and the one or more carrier aggregation combinations supported by the UE.

In an exemplary embodiment, the act S15 may include the following acts.

A carrier aggregation capability of one or more frequency bands not actually accessed by the UE may be determined according to the configuration information for the inter-frequency neighbor cell, at the preset physical frequency point, of the frequency band basis and the one or more carrier aggregation combinations supported by the UE. The target frequency band of the secondary carrier required to be configured by the UE may be determined according to the carrier aggregation capability of the one or more frequency bands not actually accessed by the UE.

The preset physical frequency point may refer to a preset physical frequency point of a serving cell.

For example, multi-band indication configuration supported by the serving cell may be as follows: a primary frequency band may be band 38 and a secondary frequency band may be band 41. The frequency band basis determined by the base station side may be the band 38. The preset physical frequency point may be 2600 MHz. The configuration information for the inter-frequency neighbor cell, at the preset physical frequency point, of the frequency band basis may be that the serving cell does not have an inter-frequency neighbor cell of the band 38. The carrier aggregation combinations supported by the UE may be a non-contiguous intra-band carrier aggregation in the band 38 and a non-contiguous intra-band carrier aggregation in the band 41. Under such a condition, the UE cannot perform carrier aggregation of the primary frequency band 38, and can only the contiguous intra-band carrier aggregation of the secondary frequency band 41. Based on the above information, the carrier aggregation capability of the frequency bands not actually accessed by the UE may be determined as follows: the UE supports the contiguous intra-band carrier aggregation of the secondary frequency band 41. Therefore, the target frequency band of the secondary carrier required to be configured by the UE may be determined as the band 41.

In an exemplary embodiment, when the frequency bands not actually accessed by the UE include a plurality of frequency bands supporting carrier aggregation, the act of determining, according to the carrier aggregation capability of the one or more frequency bands not actually accessed by the UE, the target frequency band of the secondary carrier required to be configured by the UE may include the following acts.

A priority sequence of the frequency bands not actually accessed by the UE may be acquired.

The target frequency band of the secondary carrier required to be configured by the UE may be determined according to the priority sequence of the frequency bands not actually accessed by the UE and the carrier aggregation capability of the frequency bands not actually accessed by the UE.

For example, if the UE simultaneously supports non-contiguous intra-band carrier aggregation in the band 41 and non-contiguous intra-band carrier aggregation in the band 60, a priority may be set, and the frequency band with the highest priority may be determined as the target frequency band.

At act S17, a corresponding reconfiguration message may be sent to the UE according to a carrier aggregation capability of the UE in the target frequency band, and an inter-frequency neighbor cell, at the preset physical frequency point, of the target frequency band may be used as a secondary serving cell.

The carrier aggregation capability of the UE in the target frequency band may include: the UE supporting a non-contiguous intra-band carrier aggregation or contiguous intra-band carrier aggregation or inter-band carrier aggregation of the target frequency band.

In an exemplary embodiment, when the UE supports the non-contiguous intra-band carrier aggregation or contiguous intra-band carrier aggregation of the target frequency band, the act S17 may include the following acts.

The reconfiguration message may be sent to the UE according to the carrier aggregation capability of the UE in the target frequency band, and the inter-frequency neighbor cell, at the preset physical frequency point, of the target frequency band may be used as the secondary serving cell. In this embodiment, the reconfiguration message may include a target frequency band of the secondary carrier required to be configured by the UE, and information indicating to modify an Evolved Universal Terrestrial Radio Access (E-UTRA) Absolute Radio Frequency Channel Number (EARFCN) of a frequency band basis corresponding to the preset physical frequency point of the serving cell into an EARFCN of the target frequency band. For example, if the target frequency band is the band 41, the UE supports the non-contiguous intra-band carrier aggregation or contiguous intra-band carrier aggregation of the band 41, and the preset physical frequency point is 2600 MHz, then the base station side may send a reconfiguration message to the UE, and may directly add an inter-frequency neighbor cell of the band 41 as a secondary serving cell. The reconfiguration message may include information indicating that the UE needs to carry out addition operation for the secondary carrier of the band 41, and information indicating to modify the EARFCN value e.g., 38050 of the band 38 corresponding to the physical frequency point 2600 MHz of the serving cell into the EARFCN value e.g., 40690 of the band 41.

In an exemplary embodiment, if the reconfiguration message further includes information for carrying out secondary carrier inter-frequency measurement of the target frequency band, the act of using the inter-frequency neighbor cell, at the preset physical frequency point, of the target frequency band as the secondary serving cell may include the following act.

The inter-frequency neighbor cell, at the preset physical frequency point, of the target frequency band may be used as the secondary serving cell according to a measurement result of the secondary carrier inter-frequency measurement of the target frequency band carried out according to the reconfiguration message by the UE.

In the method for carrier aggregation configuration based on the multi-band capability of the embodiment of the present disclosure, the base station side may use the inter-frequency neighbor cell, at the preset physical frequency point, of the target frequency band as the secondary serving cell according to the secondary carrier inter-frequency measurement result of the target frequency band; or the base station side may directly use the inter-frequency neighbor cell, at the preset physical frequency point, of the target frequency band as the secondary serving cell.

In an exemplary embodiment, when the UE supports the inter-band carrier aggregation of the target frequency band, the act S17 may include the following acts.

A first target frequency band and a second target frequency band of the inter-band carrier aggregation supported by the UE may be acquired. The target frequency band including the preset physical frequency point may be the first target frequency band, and the target frequency band not including the preset physical frequency point may be the second target frequency band.

The reconfiguration message may be sent to the UE, and the inter-frequency neighbor cell, at the preset physical frequency point, of the second target frequency band may be used as the secondary serving cell. In this embodiment, the reconfiguration message may include the first target frequency band including the secondary carrier required to be configured by the UE, and information indicating to modify an E-UTRA Absolute Radio Frequency Channel Number (EARFCN) of a frequency band basis corresponding to the preset physical frequency point of the serving cell into an EARFCN of the first target frequency band.

For example, if the UE supports inter-band carrier aggregation in the band 41 and the band 1 (for example, 1920 MHz to 1980 MHz for uplink, and 2110 MHz to 2170 MHz for downlink), and the preset physical frequency point is 2600 MHz, which belongs to the band 41 and does not belong to the band 1, then the first target frequency band is band 41, and the second target frequency band is band 1. The base station side may send a reconfiguration message to the UE, and may directly add an inter-frequency neighbor cell of the band 1 as the secondary serving cell. The reconfiguration message may include information indicating that the UE needs to carry out addition operation for the secondary carrier of the band 41, and information indicating to modify the EARFCN value e.g., 38050 of the band 38 corresponding to the physical frequency point 2600 MHz of the serving cell into the EARFCN value e.g., 40690 of the band 41.

In an exemplary embodiment, if the reconfiguration message further includes information for carrying out secondary carrier inter-frequency measurement of the target frequency band, the act of using the inter-frequency neighbor cell, at the preset physical frequency point, of the target frequency band as the secondary serving cell may include the following act.

The inter-frequency neighbor cell, at the preset physical frequency point, of the target frequency band may be used as the secondary serving cell according to a measurement result of the secondary carrier inter-frequency measurement of the target frequency band carried out according to the reconfiguration message by the UE.

In the method for carrier aggregation configuration based on the multi-band capability of the embodiment of the present disclosure, the base station side may use the inter-frequency neighbor cell, at the preset physical frequency point, of the second target frequency band as the secondary serving cell according to the secondary carrier inter-frequency measurement result of the target frequency band; or the base station side may directly use the inter-frequency neighbor cell, at the preset physical frequency point, of the second target frequency band as the secondary serving cell.

In an exemplary embodiment, the act of sending the reconfiguration message to the UE may include the following act.

The reconfiguration message may be sent to the UE via a Radio Resource Control (RRC) signaling.

It may be understood that in the method for carrier aggregation configuration based on the multi-band capability of the embodiments of the present disclosure, the specific mode in which the base station sends a reconfiguration message to the UE is not limited specifically.

Figure 2:
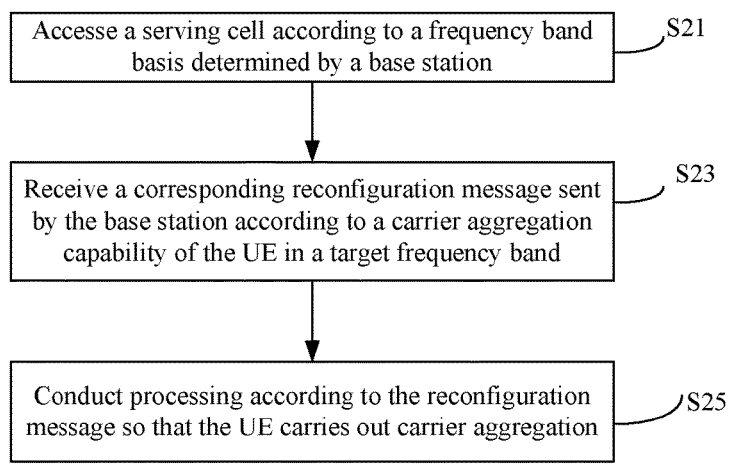
FIG. 2 shows a flow chart of a method for carrier aggregation configuration based on multi-band capability which is applied to a UE side according to an embodiment of the present disclosure.

Another embodiment of the present disclosure provides a method for carrier aggregation configuration based on the multi-band capability. The method may be applied to an UE side. As shown in FIG. 2 the method may include the following acts S21 to S25.

At act S21, a serving cell may be accessed according to a frequency band basis determined by a base station.

The frequency band basis may refer to a frequency band in which UE accesses a serving cell. After determining the frequency band basis, the base station side may repeatedly broadcast the frequency band in a broadcast message, so that the UE may determine the frequency band basis according to the broadcast message and access the serving cell according to the frequency band basis.

At act S23, a corresponding reconfiguration message sent by the base station according to a carrier aggregation capability of the UE in a target frequency band may be received.

The carrier aggregation capability of the UE in the target frequency band may include: the UE supporting a non-contiguous intra-band carrier aggregation or contiguous intra-band carrier aggregation or inter-band carrier aggregation of the target frequency band.

At act S25, processing may be conducted according to the reconfiguration message so that the UE carries out carrier aggregation. In an exemplary embodiment, when the UE supports the non-contiguous intra-band carrier aggregation or contiguous intra-band carrier aggregation of the target frequency band, the act S25 may include the following acts.

According to the reconfiguration message, an E-UTRA Absolute Radio Frequency Channel Number (EARFCN) of a frequency band basis corresponding to a preset physical frequency point of the serving cell may be modified into an EARFCN of the target frequency band, a secondary carrier adding operation may be performed for a secondary carrier corresponding to the target frequency band, and a reconfiguration completion message may be sent to the base station.

In an exemplary embodiment, when the UE supports the inter-band carrier aggregation of the target frequency band, the act S25 may include the following acts.

A first target frequency band and a second target frequency band supporting inter-band carrier aggregation may be reported. The target frequency band including the preset physical frequency point may be the first target frequency band, and the target frequency band not including the preset physical frequency point may be the second target frequency band.

According to the reconfiguration message, an E-UTRA Absolute Radio Frequency Channel Number (EARFCN) of a frequency band basis corresponding to the preset physical frequency point of the serving cell may be modified into an EARFCN of the first target frequency band, a secondary carrier adding operation may be performed for a secondary carrier corresponding to the first target frequency band, and a reconfiguration completion message may be sent to the base station.

In an exemplary embodiment, the act of conducting processing according to the reconfiguration message may further include the following act.

Secondary carrier inter-frequency measurement of the target frequency band may be carried out, and a measurement result may be sent to the base station.

The method for carrier aggregation configuration based on multi-band capability of the embodiments of the present disclosure is described by giving the following examples.

On a Base Station Side

The frequency band configuration information of a serving cell of the base station side may be as follows: multi-band indication configuration supported by the serving cell is that a primary frequency band is band 38 and a secondary frequency band is band 41. The frequency bands supported by the UE may be the band 38 and the band 41. Under such a condition, the frequency band basis may be determined to be the band 38, that is, the UE may access the serving cell in the band 38. If the carrier aggregation combination supported by the UE is non-contiguous intra-band carrier aggregation in the band 41, and the serving cell has an inter-frequency neighbor cell of the band 41, then the UE cannot perform carrier aggregation of the primary frequency band 38, and can only perform non-contiguous intra-band carrier aggregation of the secondary frequency band 41. Based on the above information, the carrier aggregation capability of the frequency bands not actually accessed by the UE may be determined as follows: the UE supports non-contiguous intra-band carrier aggregation of the band 41. Therefore, the target frequency band of the secondary carrier required to be configured by the UE may be determined as the band 41.

Because the UE supports non-contiguous intra-band carrier aggregation in the band 41, the base station side may need to initiate a secondary carrier inter-frequency measurement for the neighbor cell of band 41. An inter-frequency neighbor cell of the band 41 may be added, based on a measurement result for secondary carrier inter-frequency measurement reported by the UE, to serve as a secondary serving cell. Alternatively, an inter-frequency neighbor cell of the band 41 may be directly added to serve as a secondary serving cell. Meanwhile, the EARFCN value e.g., 38050 of the band 38 corresponding to the physical frequency point 2600 MHz of the serving cell may be modified into the EARFCN value e.g., 40690 of the band 41.

On a User Equipment Side

According to a frequency band basis, namely, a band 38, the UE accesses a serving cell.

The EARFCN value e.g., 38050 of the band 38 corresponding to the physical frequency point 2600 MHz may be modified into an EARFCN value e.g., 40690 of the band 41 according to the reconfiguration message sent by the base station side.

Based on a secondary carrier inter-frequency measurement of the band 41 included in the reconfiguration message sent by the base station side, measurement of the corresponding frequency point may be carried out, and a measurement result may be reported to the base station side.

Based on a secondary carrier resource configuration of the band 41 included in the reconfiguration message sent by the base station side, a secondary carrier adding operation may be carried out, and a reconfiguration complete message may be sent to the base station side.

From the above description, it may be concluded that the method for carrier aggregation configuration based on multi-band capability provided in some embodiments of the present disclosure comprehensively considers the multi-band information configured by the base station side and the carrier aggregation capability information of the UE, and may add, for the UE, carrier aggregation of the frequency band which is not currently accessed. By adopting this method, the impact on the carrier aggregation function of the UE, which is caused by the limitation of the cell frequency band or the adjacent cell configuration of the base station side or by the restriction of carrier aggregation capability of the UE, may be avoided. By virtue of this method, use range of the carrier aggregation function may be greatly expanded, and frequency spectrum efficiency of the system may be effectively increased, thereby improving the user experience.

Figure 3:
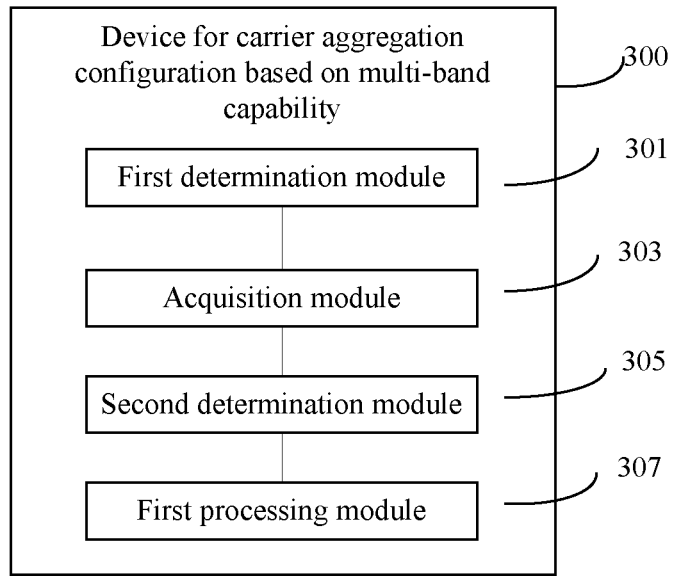
FIG. 3 shows a structure block diagram of a device for carrier aggregation configuration based on multi-band capability which is applied to a base station side according to an embodiment of the present disclosure.

Still another embodiment of the present disclosure provides a device for carrier aggregation configuration based on multi-band capability. As shown in FIG. 3, the device 300 may include: a first determination module 301, an acquisition module 303, a second determination module 305 and a first processing module 307.

The first determination module 301 may be configured to determine a frequency band basis for access of UE to a serving cell so as to enable the UE to access the serving cell according to the frequency band basis. The serving cell may be configured with at least two frequency bands, and an overlapping part may exist between the at least two frequency bands.

The acquisition module 303 may be configured to acquire configuration information for an inter-frequency neighbor cell, at a preset physical frequency point, of the frequency band basis for the access of the UE to the serving cell, and one or more carrier aggregation combinations supported by the UE.

The second determination module 305 may be configured to determine, according to the configuration information for the inter-frequency neighbor cell, at the preset physical frequency point, of the frequency band basis and the one or more carrier aggregation combinations supported by the UE, a target frequency band of a secondary carrier required to be configured by the UE.

The first processing module 307 may be configured to, according to a carrier aggregation capability of the UE in the target frequency band, send a corresponding reconfiguration message to the UE and use an inter-frequency neighbor cell, at the preset physical frequency point, of the target frequency band as a secondary serving cell.

In an exemplary embodiment, the carrier aggregation capability of the UE in the target frequency band may include: the UE supporting a non-contiguous intra-band carrier aggregation or contiguous intra-band carrier aggregation or inter-band carrier aggregation of the target frequency band.

Figure 4:
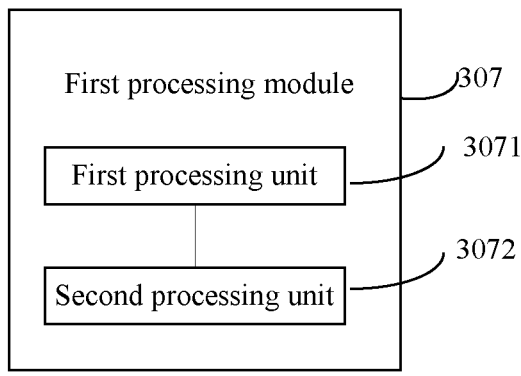
FIG. 4 shows a structural block diagram of a first processing module according to an embodiment of the present disclosure.

In an exemplary embodiment, as shown in FIG. 4, when the UE supports the non-contiguous intra-band carrier aggregation or contiguous intra-band carrier aggregation of the target frequency band, the first processing module 307 may include a first processing unit 3071.

The first processing unit 3071 may be configured to send the reconfiguration message to the UE according to the carrier aggregation capability of the UE in the target frequency band, and use the inter-frequency neighbor cell, at the preset physical frequency point, of the target frequency band as the secondary serving cell. In this exemplary embodiment, the reconfiguration message may include a target frequency band of the secondary carrier required to be configured by the UE, and information indicating to modify an E-UTRA Absolute Radio Frequency Channel Number (EARFCN) of a frequency band basis corresponding to the preset physical frequency point of the serving cell into an EARFCN of the target frequency band.

In an exemplary embodiment, as shown in FIG. 4, when the UE supports the inter-band carrier aggregation of the target frequency band, the first processing unit 307 may include a second processing unit 3072.

The second processing unit 3072 may be configured to:
acquire a first target frequency band and a second target frequency band of the inter-band carrier aggregation supported by the UE, where the target frequency band including the preset physical frequency point is the first target frequency band, and the target frequency band not including the preset physical frequency point is the second target frequency band; and send the reconfiguration message to the UE, and use the inter-frequency neighbor cell, at the preset physical frequency point, of the second target frequency band as the secondary serving cell. In this exemplary embodiment, the reconfiguration message may include the first target frequency band including the secondary carrier required to be configured by the UE, and information indicating to modify an E-UTRA Absolute Radio Frequency Channel Number (EARFCN) of a frequency band basis corresponding to the preset physical frequency point of the serving cell into an EARFCN of the first target frequency band.

In an exemplary embodiment, if the reconfiguration message further includes information for carrying out secondary carrier inter-frequency measurement of the target frequency band, the first processing unit 3071 may be configured to:
use the inter-frequency neighbor cell, at the preset physical frequency point, of the target frequency band as the secondary serving cell according to a measurement result of the secondary carrier inter-frequency measurement of the target frequency band carried out according to the reconfiguration message by the UE.

In an exemplary embodiment, if the reconfiguration message further includes information for carrying out secondary carrier inter-frequency measurement of the target frequency band, the second processing unit 3072 may be configured to:
use the inter-frequency neighbor cell, at the preset physical frequency point, of the second target frequency band as the secondary serving cell according to a measurement result of the secondary carrier inter-frequency measurement of the target frequency band carried out according to the reconfiguration message by the UE.

Figure 5:
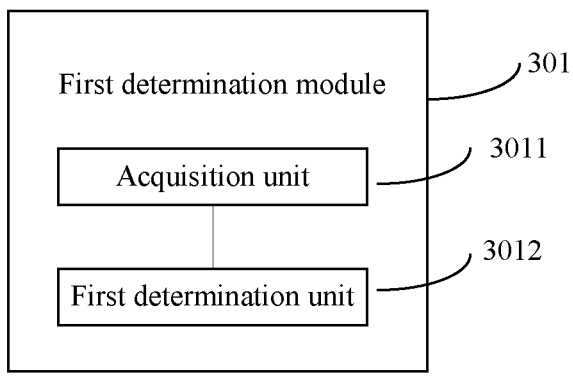
FIG. 5 shows a structural block diagram of a first determination module according to an embodiment of the present disclosure.

In an exemplary embodiment, as shown in FIG. 5, the first determination module 301 may include: an acquisition unit 3011 and a first determination unit 3012.

The acquisition unit 3011 may be configured to acquire frequency band configuration information of the serving cell and information of one or more frequency bands supported by the UE.

The first determination unit 3012 may be configured to determine, according to the frequency band configuration information of the serving cell and the information of the one or more frequency bands supported by the UE, the frequency band basis for the access of the UE to the serving cell.

Figure 6:
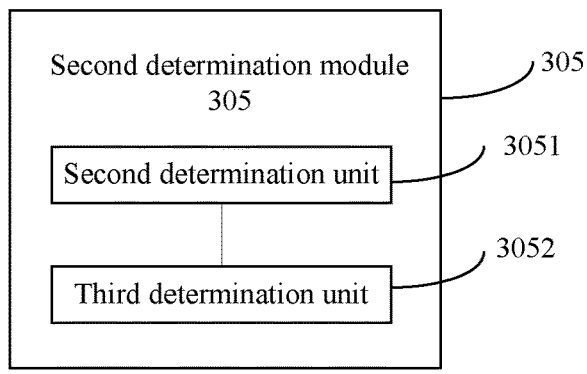
FIG. 6 shows a structural block diagram of a second determination module according to an embodiment of the present disclosure.

In an exemplary embodiment, as shown in FIG. 6, the second determination module 305 may include: a second determination unit 3051 and a third determination unit 3052.

The second determination unit 3051 may be configured to determine, according to the configuration information for the inter-frequency neighbor cell, at the preset physical frequency point, of the frequency band basis and the one or more carrier aggregation combinations supported by the UE, a carrier aggregation capability of one or more frequency bands not actually accessed by the UE.

The third determination unit 3052 may be configured to determine, according to the carrier aggregation capability of the one or more frequency bands not actually accessed by the UE, the target frequency band of the secondary carrier required to be configured by the UE.

In an exemplary embodiment, when the frequency bands not actually accessed by the UE include a plurality of frequency bands supporting carrier aggregation, the third determination unit 3052 may be configured to:
acquire a priority sequence of the frequency bands not actually accessed by the UE; and
determine, according to the priority sequence of the frequency bands not actually accessed by the UE and the carrier aggregation capability of the frequency bands not actually accessed by the UE, the target frequency band of the secondary carrier required to be configured by the UE.

In an exemplary embodiment, the first processing module 307 may be configured to send the reconfiguration message to the UE via a Radio Resource Control (RRC) signaling.

Figure 7:
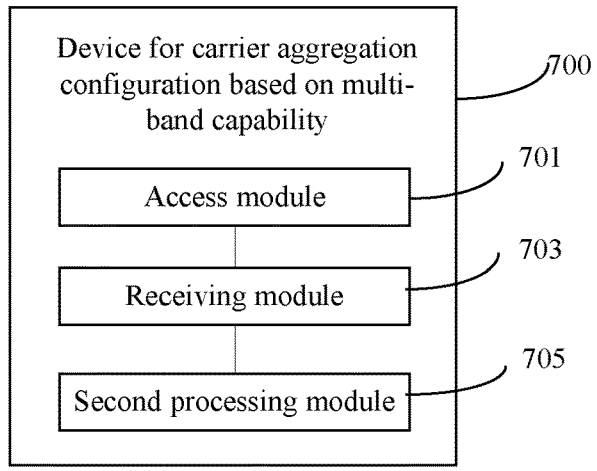
FIG. 7 shows a structure block diagram of a device for carrier aggregation configuration based on multi-band capability which is applied to a UE side according to an embodiment of the present disclosure.

Still another embodiment of the present disclosure provides a device for carrier aggregation configuration based on multi-band capability. As shown in FIG. 7, the device 700 may include: an access module 701, a receiving module 703 and a second processing module 705.

The access module 701 may be configured to access a serving cell according to a frequency band basis determined by a base station.

The receiving module 703 may be configured to receive a corresponding reconfiguration message sent by the base station according to a carrier aggregation capability of user equipment (UE) in a target frequency band.

The second processing module 705 may be configured to conduct processing according to the reconfiguration message so that the UE carries out carrier aggregation.

In an exemplary embodiment, the carrier aggregation capability of the UE in the target frequency band includes: the UE supporting a non-contiguous intra-band carrier aggregation or contiguous intra-band carrier aggregation or inter-band carrier aggregation of the target frequency band.

Figure 8:
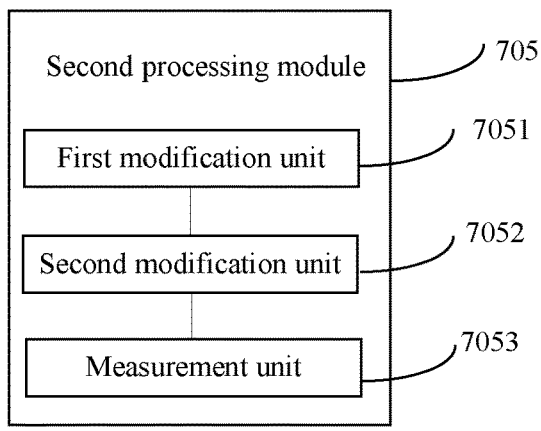
FIG. 8 shows a structural block diagram of a second processing module according to an embodiment of the present disclosure.

In an exemplary embodiment, when the UE supports the non-contiguous intra-band carrier aggregation or contiguous intra-band carrier aggregation of the target frequency band, as shown in FIG. 8, the second processing module 705 may include a first modification unit 7051.

The first modification unit 7051 may be configured to, according to the reconfiguration message, modify an E-UTRA Absolute Radio Frequency Channel Number (EARFCN) of a frequency band basis corresponding to a preset physical frequency point of the serving cell into an EARFCN of the target frequency band and perform a secondary carrier adding operation for a secondary carrier corresponding to the target frequency band, and send a reconfiguration completion message to the base station.

In an exemplary embodiment, when the UE supports the inter-band carrier aggregation of the target frequency band, as shown in FIG. 8, the second processing module 705 may include a second modification unit 7052.

The second modification unit 7052 may be configured to:

report a first target frequency band and a second target frequency band supporting inter-band carrier aggregation, where the target frequency band including the preset physical frequency point is the first target frequency band, and the target frequency band not including the preset physical frequency point is the second target frequency band; and according to the reconfiguration message, modify an E-UTRA Absolute Radio Frequency Channel Number (EARFCN) of a frequency band basis corresponding to the preset physical frequency point of the serving cell into an EARFCN of the first target frequency band and perform a secondary carrier adding operation for a secondary carrier corresponding to the first target frequency band, and send a reconfiguration completion message to the base station.

In an exemplary embodiment, as shown in FIG. 8, the second processing module 705 may further include a measurement unit 7053.

The measurement unit 7053 may be configured to carry out secondary carrier inter-frequency measurement of the target frequency band, and sending a measurement result to the base station.

An embodiment of the present disclosure provides a computer readable storage medium. The computer readable storage medium may store computer executable instructions. The computer executable instructions, when being executed by a processor, may be used for executing the method for carrier aggregation configuration based on multi-band capability as described in the above embodiments.

The present disclosure is described herein with reference to flow charts and/or block diagrams of methods, apparatus, and computer program products according to the embodiments of the present disclosure. It should be understood that each process and/or block in the flow charts and/or the block diagrams, or combination of processes and/or blocks in the flow charts and/or the block diagrams may be implemented by computer program instructions. The computer program instructions may be provided to a general-purpose computer, a special-purpose computer, an embedded processor or other programmable data processing equipment to generate a machine, such that the instructions executed by the processor of the computer or other programmable data processing device may generate a device for implementing the functions specified in one or more flows of the flow chart and/or one or more blocks of the block diagram.

The computer program instructions may also be stored in a computer readable memory that may direct a computer or other programmable data processing device to operate in a specific manner, such that the instructions stored in the computer readable memory may produce a manufacturing product including an instruction device. The instruction device may realize the functions specified in one or more flows of the flow chart and/or one block or multiple blocks of the block diagram.

The computer program instructions may alternatively be loaded onto a computer or other programmable data processing apparatus, and a series of operational acts may be performed on a computer or other programmable device to produce a computer-implemented process, such that the instructions executed on the computer or other programmable device may provide acts for implementing the functions specified in one or more flows of the flow chart and/or one or more blocks of the block diagram.

The above descriptions are merely some embodiments of the present disclosure. It should be noted that for an ordinary person in the technical field of the present disclosure, several modifications and variations may be made without departing from the principles of the present application, and these modifications and variations are also within the scope of the present application.

INDUSTRIAL APPLICABILITY

By virtue of the method for carrier aggregation configuration based on multi-band capability provided in some embodiments of the present disclosure, the multi-band information configured by the base station side and the carrier aggregation capability information of the UE may be comprehensively considered to determine the target frequency band of the secondary carrier required to be configured by the UE, thereby realizing carrier aggregation of the target frequency band. According to the method for carrier aggregation configuration based on the multi-band capability of some embodiments of the present disclosure, the impact on the carrier aggregation function of the UE, which is caused by the limitation of the cell frequency band or the adjacent cell configuration of the base station side or by the restriction of carrier aggregation capability of the UE, may be avoided. By virtue of the solution provided in some embodiments of the present disclosure, use range of the carrier aggregation function may be greatly expanded, and frequency spectrum efficiency of the system may be effectively increased, thereby improving the user experience.

What is claimed is:

1. A method for carrier aggregation configuration based on multi-band capability, wherein the method is applied to a base station side and comprises:

determining a frequency band basis for access of user equipment (UE) to a serving cell so as to enable the UE to access the serving cell according to the frequency band basis, wherein the serving cell is configured with at least two frequency bands, and an overlapping part exists between the at least two frequency bands;

acquiring configuration information for an inter-frequency neighbor cell, at a preset physical frequency point, of the frequency band basis for the access of the UE to the serving cell, and one or more carrier aggregation combinations supported by the UE;

determining, according to the configuration information for the inter-frequency neighbor cell, at the preset physical frequency point, of the frequency band basis and the one or more carrier aggregation combinations supported by the UE, a target frequency band of a secondary carrier required to be configured by the UE;

sending a corresponding reconfiguration message to the UE according to a carrier aggregation capability of the UE in the target frequency band, and using an inter-frequency neighbor cell, at the preset physical frequency point, of the target frequency band as a secondary serving cell.

2. The method as claimed in claim 1, wherein the carrier aggregation capability of the UE in the target frequency band comprises: the UE supporting a non-contiguous intra-band carrier aggregation or contiguous intra-band carrier aggregation or inter-band carrier aggregation of the target frequency band.

3. The method as claimed in claim 2, wherein when the UE supports the non-contiguous intra-band carrier aggregation or contiguous intra-band carrier aggregation of the target frequency band, sending the corresponding reconfiguration message to the UE according to the carrier aggregation capability of the UE in the target frequency band, and using the inter-frequency neighbor cell, at the preset physical frequency point, of the target frequency band as the secondary serving cell comprises:

sending the reconfiguration message to the UE according to the carrier aggregation capability of the UE in the target frequency band, and using the inter-frequency neighbor cell, at the preset physical frequency point, of the target frequency band as the secondary serving cell, wherein the reconfiguration message comprises a target frequency band of the secondary carrier required to be configured by the UE, and information indicating to modify an Evolved Universal Terrestrial Radio Access (E-UTRA) Absolute Radio Frequency Channel Number (EARFCN) of a frequency band basis corresponding to the preset physical frequency point of the serving cell into an EARFCN of the target frequency band.

4. The method as claimed in claim 2, wherein when the UE supports the inter-band carrier aggregation of the target frequency band, sending the corresponding reconfiguration message to the UE according to the carrier aggregation capability of the UE in the target frequency band, and using the inter-frequency neighbor cell, at the preset physical frequency point, of the target frequency band as the secondary serving cell comprises:

acquiring a first target frequency band and a second target frequency band of the inter-band carrier aggregation supported by the UE, wherein the target frequency band comprising the preset physical frequency point is the first target frequency band, and the target frequency band not comprising the preset physical frequency point is the second target frequency band; and sending the reconfiguration message to the UE, and using the inter-frequency neighbor cell, at the preset physical frequency point, of the second target frequency band as the secondary serving cell, wherein the reconfiguration message comprises the first target frequency band comprising the secondary carrier required to be configured by the UE, and information indicating to modify an Evolved Universal Terrestrial Radio Access (E-UTRA1 Absolute Radio Frequency Channel Number (EARFCN) of a frequency band basis corresponding to the preset physical frequency point of the serving cell into an EARFCN of the first target frequency band.

5. The method as claimed in claim 3, wherein if the reconfiguration message further comprises information for carrying out secondary carrier inter-frequency measurement of the target frequency band, using the inter-frequency neighbor cell, at the preset physical frequency point, of the target frequency band as the secondary serving cell comprises:

using the inter-frequency neighbor cell, at the preset physical frequency point, of the target frequency band as the secondary serving cell according to a measurement result of the secondary carrier inter-frequency measurement of the target frequency band carried out according to the reconfiguration message by the UE.

6. The method as claimed in claim 4, wherein if the reconfiguration message further comprises information for carrying out secondary carrier inter-frequency measurement of the target frequency band, using the inter-frequency neighbor cell, at the preset physical frequency point, of the second target frequency band as the secondary serving cell comprises:

using the inter-frequency neighbor cell, at the preset physical frequency point, of the second target frequency band as the secondary serving cell according to a measurement result of the secondary carrier inter-frequency measurement of the target frequency band carried out according to the reconfiguration message by the UE.

7. The method as claimed in claim 1, wherein determining the frequency band basis for the access of the UE to the serving cell comprises:

acquiring frequency band configuration information of the serving cell and information of one or more frequency bands supported by the UE; and determining, according to the frequency band configuration information of the serving cell and the information of the one or more frequency bands supported by the UE, the frequency band basis for the access of the UE to the serving cell.

8. The method as claimed in claim 1, wherein determining, according to the configuration information for the inter-frequency neighbor cell, at the preset physical frequency point, of the frequency band basis and the one or more carrier aggregation combinations supported by the UE, the target frequency band of the secondary carrier required to be configured by the UE comprises:

determining, according to the configuration information for the inter-frequency neighbor cell, at the preset physical frequency point, of the frequency band basis and the one or more carrier aggregation combinations supported by the UE, a carrier aggregation capability of one or more frequency bands not actually accessed by the UE; and determining, according to the carrier aggregation capability of the one or more frequency bands not actually accessed by the UE, the target frequency band of the secondary carrier required to be configured by the UE.

9. The method as claimed in claim 8, wherein when the frequency bands not actually accessed by the UE comprise a plurality of frequency bands supporting carrier aggregation, determining, according to the carrier aggregation capability of the one or more frequency bands not actually accessed by the UE, the target frequency band of the secondary carrier required to be configured by the UE comprises:

acquiring a priority sequence of the frequency bands not actually accessed by the UE; and determining, according to the priority sequence of the frequency bands not actually accessed by the UE and the carrier aggregation capability of the frequency bands not actually accessed by the UE, the target frequency band of the secondary carrier required to be configured by the UE.

10. The method as claimed in claim 1, wherein sending the reconfiguration message to the UE comprises:

sending the reconfiguration message to the UE via a Radio Resource Control (RRC) signaling.

11. A method for carrier aggregation configuration based on multi-band capability, wherein the method is applied to a user equipment (UE) side and comprises:

accessing a serving cell according to a frequency band basis determined by a base station;

receiving a corresponding reconfiguration message sent by the base station according to a carrier aggregation capability of the UE in a target frequency band; and conducting processing according to the reconfiguration message so that the UE carries out carrier aggregation.

12. The method as claimed in claim 11, wherein the carrier aggregation capability of the UE in the target frequency band comprises: the UE supporting a non-contiguous intra-band carrier aggregation or contiguous intra-band carrier aggregation or inter-band carrier aggregation of the target frequency band.

13. The method as claimed in claim 12, wherein when the UE supports the non-contiguous intra-band carrier aggregation or contiguous intra-band carrier aggregation of the target frequency band, conducting processing according to the reconfiguration message comprises:

according to the reconfiguration message, modifying an Evolved Universal Terrestrial Radio Access (E-UTRA) Absolute Radio Frequency Channel Number (EARFCN) of a frequency band basis corresponding to a preset physical frequency point of the serving cell into an EARFCN of the target frequency band and performing a secondary carrier adding operation for a secondary carrier corresponding to the target frequency band, and sending a reconfiguration completion message to the base station.

14. The method as claimed in claim 12, wherein when the UE supports the inter-band carrier aggregation of the target frequency band, conducting processing according to the reconfiguration message comprises:

reporting a first target frequency band and a second target frequency band supporting inter-band carrier aggregation, wherein the target frequency band comprising the preset physical frequency point is the first target frequency band, and the target frequency band not comprising the preset physical frequency point is the second target frequency band; and according to the reconfiguration message, modifying an Evolved Universal Terrestrial Radio Access (E-UTRA) Absolute Radio Frequency Channel Number (EARFCN) of a frequency band basis corresponding to the preset physical frequency point of the serving cell into an EARFCN of the first target frequency band and performing a secondary carrier adding operation for a secondary carrier corresponding to the first target frequency band, and sending a reconfiguration completion message to the base station.

15. The method as claimed in claim 13 or 11, wherein conducting processing according to the reconfiguration message further comprises:

carrying out secondary carrier inter-frequency measurement of the target frequency band, and sending a measurement result to the base station.

16. A device for carrier aggregation configuration based on multi-band capability, comprising:

a first determination module, configured to determine a frequency band basis for access of user equipment (UE) to a serving cell so as to enable the UE to access the serving cell according to the frequency band basis, wherein the serving cell is configured with at least two frequency bands, and an overlapping part exists between the at least two frequency bands;

an acquisition module, configured to acquire configuration information for an inter-frequency neighbor cell, at a preset physical frequency point, of the frequency band basis for the access of the UE to the serving cell, and one or more carrier aggregation combinations supported by the UE;

a second determination module, configured to determine, according to the configuration information for the inter-frequency neighbor cell, at the preset physical frequency point, of the frequency band basis and the one or more carrier aggregation combinations supported by the UE, a target frequency band of a secondary carrier required to be configured by the UE; and a first processing module, configured to send a corresponding reconfiguration message to the UE according to a carrier aggregation capability of the UE in the target frequency band, and use an inter-frequency neighbor cell, at the preset physical frequency point, of the target frequency band as a secondary serving cell.

17. A device for carrier aggregation configuration based on multi-band capability, comprising:

an access module, configured to access a serving cell according to a frequency band basis determined by a base station;

a receiving module, configured to receive a corresponding reconfiguration message sent by the base station according to a carrier aggregation capability of user equipment (UE) in a target frequency band; and a second processing module, configured to conduct processing according to the reconfiguration message so that the UE carries out carrier aggregation.

18. The method as claimed in claim 14, wherein conducting processing according to the reconfiguration message further comprises:

carrying out secondary carrier inter-frequency measurement of the target frequency band, and sending a measurement result to the base station.

19. The device as claimed in claim 16, wherein when the UE supports non-contiguous intra-band carrier aggregation or contiguous intra-band carrier aggregation of the target frequency band, the first processing module comprises:

a first processing unit, configured to send the reconfiguration message to the UE according to the carrier aggregation capability of the UE in the target frequency band, and use the inter-frequency neighbor cell, at the preset physical frequency point, of the target frequency band as the secondary serving cell, wherein the reconfiguration message comprises a target frequency band of the secondary carrier required to be configured by the UE, and information indicating to modify an Evolved Universal Terrestrial Radio Access (E-UTRA) Absolute Radio Frequency Channel Number (EARFCN) of a frequency band basis corresponding to the preset physical frequency point of the serving cell into an EARFCN of the target frequency band.

20. The device as claimed in claim 16, wherein when the UE supports inter-band carrier aggregation of the target frequency band, the first processing module comprises a second processing unit configured to:

acquire a first target frequency band and a second target frequency band of the inter-band carrier aggregation supported by the UE, wherein the target frequency band comprising the preset physical frequency point is the first target frequency band, and the target frequency band not comprising the preset physical frequency point is the second target frequency band; and send the reconfiguration message to the UE, and use the inter-frequency neighbor cell, at the preset physical frequency point, of the second target frequency band as the secondary serving cell, wherein the reconfiguration message comprises the first target frequency band comprising the secondary carrier required to be configured by the UE, and information indicating to modify an Evolved Universal Terrestrial Radio Access (E-UTRA) Absolute Radio Frequency Channel Number (EARFCN) of a frequency band basis corresponding to the preset physical frequency point of the serving cell into an EARFCN of the first target frequency band.

* * * * *